US012661744B2

(12) United States Patent
Seyler et al.

(10) Patent No.: US 12,661,744 B2
(45) Date of Patent: Jun. 23, 2026

(54) HYDRAULIC PISTON WITH EMBEDDED LINEAR VARIABLE DIFFERENTIAL TRANSDUCER FOR PRECISION POSITION SENSING

(71) Applicant: RTX Corporation, Farmington, CT (US)

(72) Inventors: Joshua Robert Seyler, Stuart, FL (US); Parag H. Mathuria, Palm Beach Gardens, FL (US); Lajos H. Horvath, Jupiter, FL (US); James Masloski, Lake Worth, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/983,510

(22) Filed: Dec. 17, 2024

(65) Prior Publication Data

US 2026/0166665 A1     Jun. 18, 2026

(51) Int. Cl.
  *B23P 19/06*       (2006.01)
  *F01D 5/02*        (2006.01)
(52) U.S. Cl.
  CPC ............ *B23P 19/067* (2013.01); *F01D 5/025* (2013.01); *F01D 5/026* (2013.01);
  (Continued)
(58) Field of Classification Search
  CPC ............... B23P 19/067; F05D 2230/60; F05D 2230/644; F01D 5/025; F01D 5/026; F16C 2229/00
  See application file for complete search history.

(56) References Cited

U.S. PATENT DOCUMENTS 6,167,764 B1    1/2001  Calhoun
9,068,470 B2    6/2015  Mills et al.
       (Continued)

FOREIGN PATENT DOCUMENTS

CN      109058219 A    12/2018
EP      2000253 A1     10/2008
       (Continued)

OTHER PUBLICATIONS

Extended European Search Report for counterpart EP Application No. 252221163.6 dated Apr. 13, 2026.

*Primary Examiner* — Christopher J. Besler
(74) *Attorney, Agent, or Firm* — Bachman & LaPointe, P.C.

(57)        ABSTRACT

A tie bolt stretch system including a rotor assembly including a compressor section coupled with a turbine section by a curvic coupling; a tie bolt joining the compressor section to the turbine section; a stretch tool in operative communication with the tie bolt; the stretch tool comprising: a hydraulic piston in operative communication with the tie bolt, the hydraulic piston including a shaft with a predetermined dimension; a sensor in operative communication with the stretch tool, the sensor indicates a dimensional change of the predetermined dimension; and a controller in operative communication with the sensor and a servo valve fluidly coupled with a hydraulic pump; the hydraulic pump fluidly coupled with the hydraulic piston; wherein the controller is configured to operate the hydraulic piston responsive to a signal from the sensor to attain a predetermined preload stretch on the tie bolt, curvic coupling, compressor section and turbine section.

20 Claims, 3 Drawing Sheets

(52) U.S. Cl.
CPC ...... *F05D 2220/30* (2013.01); *F05D 2230/60*
(2013.01); *F05D 2240/24* (2013.01); *F05D*
*2240/60* (2013.01)

(56) References Cited

U.S. PATENT DOCUMENTS

| 9,341,266 | B1 | 5/2016 | Vivatson |
| 10,048,144 | B2 | 8/2018 | Remy et al. |
| 10,800,020 | B2 | 10/2020 | Dumelow |
| 2016/0230560 | A1* | 8/2016 | Tucker ................... F01D 5/005 |

FOREIGN PATENT DOCUMENTS

| EP | 4566750 | A1 | 11/2025 |
| WO | 20190176712 | A1 | 3/2019 |

* cited by examiner

HYDRAULIC PISTON WITH EMBEDDED LINEAR VARIABLE DIFFERENTIAL TRANSDUCER FOR PRECISION POSITION SENSING

BACKGROUND

The present disclosure is directed to the improved tie bolt stretch system with hydraulic piston assembly.

Contributing factors in auxiliary power unit (APU) turbomachinery vibrations are the specific mechanical characteristics and condition of the operating rotating components in their final assembled state. This includes all interactions with other rotating geared or static accessory structures.

While various modelling techniques are used to develop designs, it is the accommodations made to the design nominal to facilitate manufacturing, assembly and operating environment that results in variation that can result in product examples that vary significantly from the nominal predictions. Material property variation, parts manufacturing and assembly tolerance, such as runout, angular kinks between two rotors, and/or lateral offsets between two rotors, can all result in a bent rotor shape. Other sources of variation are indexing of joints among tooth options, and rotor unbalance, which also can then be major drivers of vibration characteristics not meeting the design analysis potentials.

These variations can result in scrap rework and repair and can also adversely impact reliability and maintainability of the delivered APU as a fielded machine.

SUMMARY

In accordance with the present disclosure, there is provided a tie bolt stretch system comprising a rotor assembly including a compressor section coupled with a turbine section by a curvic coupling; a tie bolt in operative communication with the rotor assembly, the tie bolt joining the compressor section to the turbine section; a stretch tool in operative communication with the tie bolt; the stretch tool comprising a hydraulic piston in operative communication with the tie bolt, the hydraulic piston including a shaft with a predetermined dimension; a sensor in operative communication with the stretch tool, the sensor configured to indicate a dimensional change of the predetermined dimension; and a controller in operative communication with the sensor and a servo valve; the servo valve is fluidly coupled with a hydraulic pump; the hydraulic pump fluidly coupled with the hydraulic piston; wherein the controller is configured to operate the hydraulic piston responsive to a signal from the sensor to attain a predetermined preload stretch on the tie bolt, curvic coupling, compressor section and turbine section.

A further embodiment of any of the foregoing embodiments may additionally and/or alternatively include the tie bolt stretch system further comprising a powerhead compressor within the compressor section; a power turbine within the turbine section; and a predetermined contact stiffness between the powerhead compressor and the power turbine; the predetermined preload stretch is determined based at least in part on the predetermined contact stiffness.

A further embodiment of any of the foregoing embodiments may additionally and/or alternatively include the predetermined preload stretch on the tie bolt along with internal rotor geometric interfaces is configured to influence a rotor generated vibration.

A further embodiment of any of the foregoing embodiments may additionally and/or alternatively include the sensor is configured to determine the distance of the predetermined preload stretch on the tie bolt.

A further embodiment of any of the foregoing embodiments may additionally and/or alternatively include the stretch tool is configured to apply a tensile force on the tie bolt and the rotor assembly to preload the tie bolt and the rotor assembly.

A further embodiment of any of the foregoing embodiments may additionally and/or alternatively include the tensile force applied to the tie bolt is linear along an axis formed between the compressor section joined to the turbine section.

A further embodiment of any of the foregoing embodiments may additionally and/or alternatively include the sensor is at least one of a strain gauge, a linear variable differential transducer, and a laser device configured to measure the change in location of the hydraulic piston.

In accordance with the present disclosure, there is provided a tie bolt stretch system comprising a rotor assembly including a compressor section coupled with a turbine section by a curvic coupling; the compressor section including at least one of a powerhead compressor and a load compressor; a tie bolt in operative communication with the rotor assembly, the tie bolt joining the compressor section to the turbine section; a stretch tool in operative communication with the tie bolt; the stretch tool comprising a hydraulic piston in operative communication with the tie bolt, the hydraulic piston including a shaft with a predetermined dimension; a sensor in operative communication with the stretch tool, the sensor configured to indicate a dimensional change of the predetermined dimension; and a controller in operative communication with the sensor and a servo valve; the servo valve is fluidly coupled with a hydraulic pump; the hydraulic pump fluidly coupled with the hydraulic piston; wherein the controller is configured to operate the hydraulic piston responsive to a signal from the sensor to attain a predetermined preload stretch on the tie bolt, curvic coupling, compressor section and turbine section.

A further embodiment of any of the foregoing embodiments may additionally and/or alternatively include a load curvic coupling within the compressor section between the powerhead compressor and the load compressor; a power turbine within the turbine section; and a predetermined contact stiffness between the powerhead compressor and the power turbine, wherein the predetermined preload stretch is determined based at least in part on the predetermined contact stiffness.

A further embodiment of any of the foregoing embodiments may additionally and/or alternatively include the predetermined preload stretch on the tie bolt along with internal rotor geometric interfaces is configured to influence a rotor generated vibration.

A further embodiment of any of the foregoing embodiments may additionally and/or alternatively include the sensor is configured to measure the change in location of the hydraulic piston.

A further embodiment of any of the foregoing embodiments may additionally and/or alternatively include the stretch tool is configured to apply a tensile force on the tie bolt and the rotor assembly to preload the tie bolt and the rotor assembly.

A further embodiment of any of the foregoing embodiments may additionally and/or alternatively include the sensor comprises at least one of a strain gauge, a linear variable differential transducer, and a laser device config-ured to measure the change in location of the hydraulic piston.

In accordance with the present disclosure, there is pro-vided a process for stretching a tie bolt with a tie bolt stretch system comprising forming a rotor assembly coupling a compressor section with a turbine section through a curvic coupling; coupling a tie bolt in operative communication with the rotor assembly; joining the compressor section to the turbine section with the tie bolt; coupling a stretch tool in operative communication with the tie bolt; the stretch tool comprising a hydraulic piston in operative communication with the tie bolt, the hydraulic piston including a shaft with a predetermined dimension; a sensor in operative commu-nication with the stretch tool, the sensor configured to indicate a dimensional change of the predetermined dimen-sion; and a controller in operative communication with the sensor and a servo valve; the servo valve is fluidly coupled with a hydraulic pump; the hydraulic pump fluidly coupled with the hydraulic piston; wherein the controller is config-ured to operate the hydraulic piston responsive to a signal from the sensor to attain a predetermined preload stretch on the tie bolt, curvic coupling, compressor section and turbine section.

A further embodiment of any of the foregoing embodi-ments may additionally and/or alternatively include the process further comprising forming a powerhead compres-sor within the compressor section; forming a power turbine within the turbine section; and creating a predetermined contact stiffness between the powerhead compressor and the power turbine, wherein the predetermined preload stretch is determined based at least in part on the predetermined contact stiffness.

A further embodiment of any of the foregoing embodi-ments may additionally and/or alternatively include the process further comprising configuring the predetermined preload stretch on the tie bolt along with internal rotor geometric interfaces to influence a rotor generated vibration.

A further embodiment of any of the foregoing embodi-ments may additionally and/or alternatively include the process further comprising configuring the sensor is config-ured to measure the change in location of the hydraulic piston.

A further embodiment of any of the foregoing embodi-ments may additionally and/or alternatively include the process further comprising configuring the stretch tool to apply a tensile force on the tie bolt and the rotor assembly to preload the tie bolt and the rotor assembly.

A further embodiment of any of the foregoing embodi-ments may additionally and/or alternatively include the process further comprising applying the tensile force to the tie bolt configured as purely linear along an axis formed between the compressor section joined to the turbine sec-tion.

A further embodiment of any of the foregoing embodi-ments may additionally and/or alternatively include the sensor is at least one of a strain gauge, a linear variable differential transducer, and a laser device configured to measure the change in location of the hydraulic piston.

Other details of the tie bolt stretch system are set forth in the following detailed description and the accompanying drawings wherein like reference numerals depict like ele-ments.

DETAILED DESCRIPTION

Figure 1:
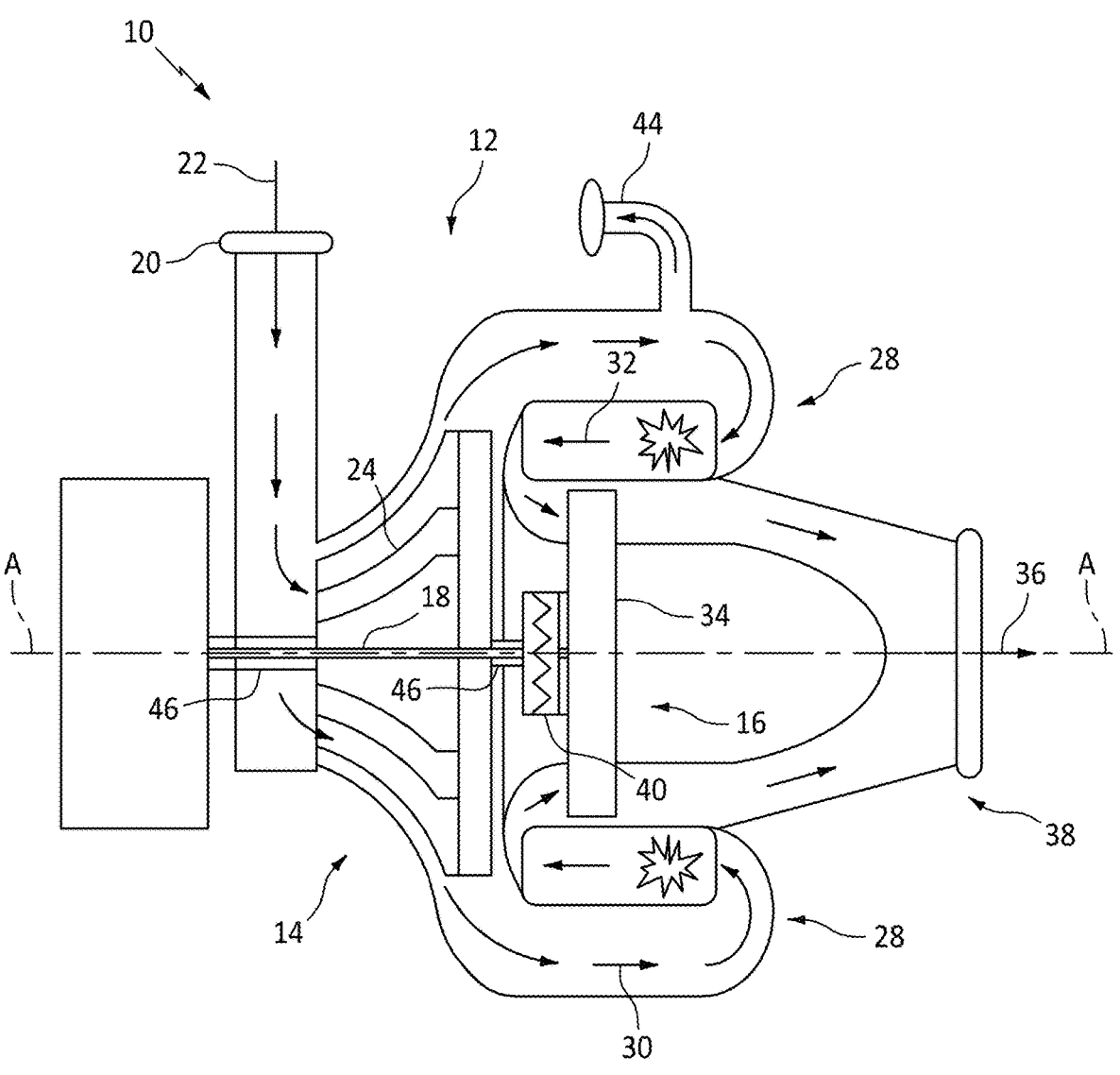
FIG. 1 is a schematic representation of an exemplary auxiliary power unit with a single curvic rotor assembly.
Figure 2:
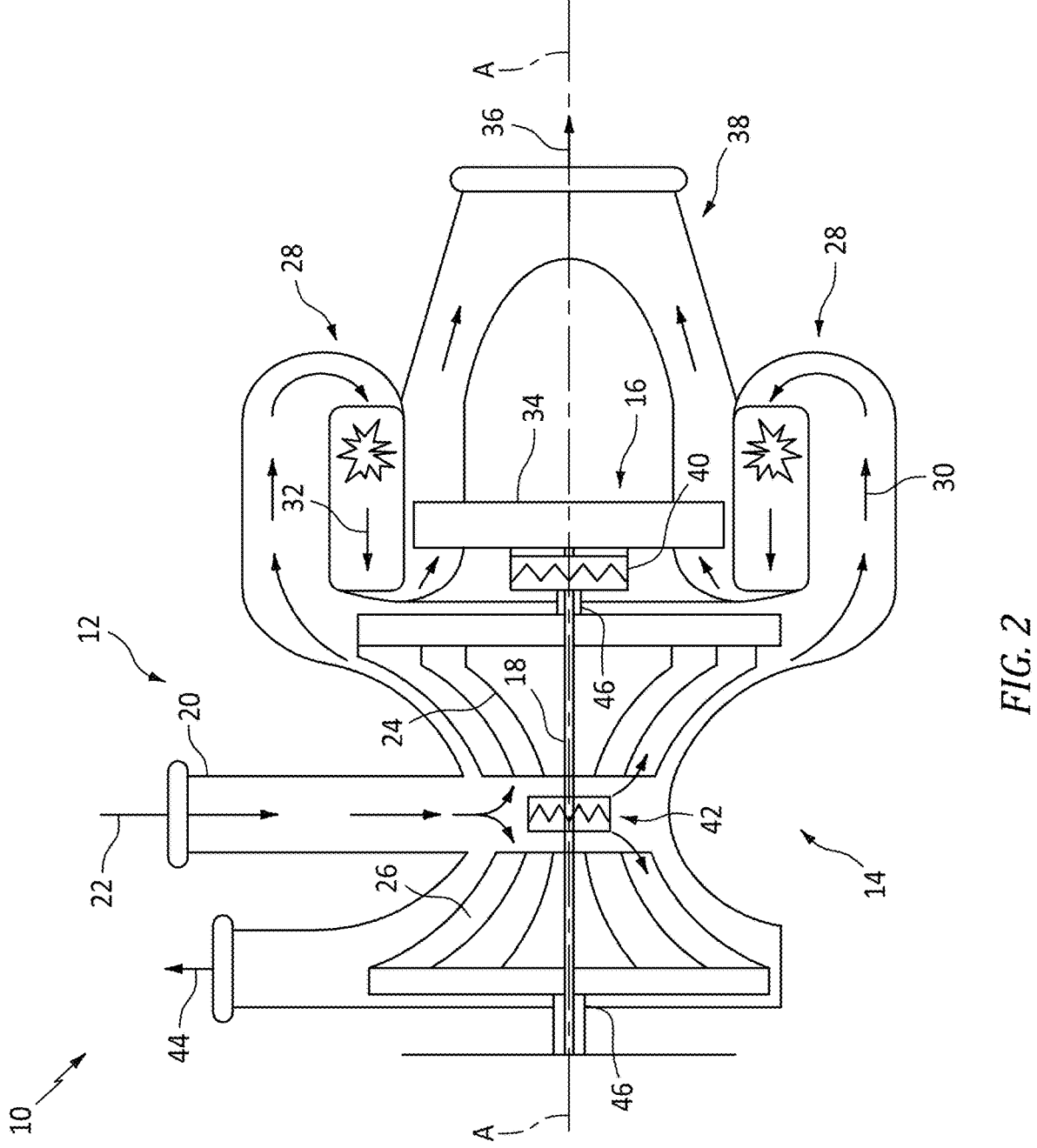
FIG. 2 is a schematic representation of an exemplary auxiliary power unit with a double curvic rotor assembly.

Referring to FIG. 1 and FIG. 2 an exemplary auxiliary power unit (APU) 10 is shown. The auxiliary power unit 10 can be a gas turbine APU. The auxiliary power unit 10 can have a radial flow rotor system/assembly 12. The radial flow rotor system 12 can include a compressor section 14 and a turbine section 16 which are joined mechanically for ease of assembly and later maintenance activity. The compressor section 14 can be joined to the turbine section 16 along an axis A. A tie bolt 18 can be employed to join the compressor section 14 to the turbine section 16.

The auxiliary power unit 10 can include an air inlet 20 for receiving inlet air 22 to be compressed in the compressor section 14 by a powerhead compressor 24 as in FIG. 1 and/or a load compressor 26 as seen in FIG. 2.

The auxiliary power unit 10 can include a combustor section 28 for adding energy into compressed air 30 from the compressor section 14. Energized air 32 can exit the com-bustor section 28 and flow through a power turbine 34 creating rotary energy in the turbine section 16. The expanded turbine exhaust 36 can be discharged through the exhaust nozzle 38.

The compressor section 14 can be joined to the turbine section 16 with a curvic coupling, such as a powerhead curvic coupling 40. For the auxiliary power unit 10 in FIG. 2, an additional load compressor curvic coupling 42 can be employed to join the powerhead compressor 24 with the load compressor 26. Curvic couplings 40, 42 can be employed as a reliable method for securely fixing mating rotors as a major component of gas turbine turbomachinery in auxiliary power units 10. The curvic couplings 40, 42 facilitate the rotor assembly 12 as the rotating part of the auxiliary power unit 10 build-up and use tensile stretch to secure the joint.

In some applications, such as that illustrated in FIG. 2, the auxiliary power unit 10 also provides a bleed air 44 to a main engine. The model of auxiliary power unit 10 shown in FIG. 2 can include the additional impeller, load compressor 26, such that the turbomachinery consists of the three rotors, whereas assembly features of those three rotors include two curvic couplings 40, 42, adapter (not shown) and the tie bolt 18.

The rotor system 12 is mounted using bearings 46, typically a ball bearing for thrust and a roller bearing. These bearings in-turn transmit vibration to the auxiliary power unit 10 components, housing, and surrounding aircraft hard-ware.

In order to influence the vibration transmitted through the auxiliary power unit 10, the tie bolt 18 is loaded or stretched to achieve a predetermined contact stiffness between the powerhead compressor 24 and power turbine 34. This con-tact stiffness must be maintained throughout the auxiliary power unit 10 ground-flight cycles to ensure that the opera-tional loads do not degrade the rotor condition throughout the design service life. The tie bolt 18 stretch along with all the internal rotor geometric interfaces influences rotor gen-erated vibration.

Figure 3:
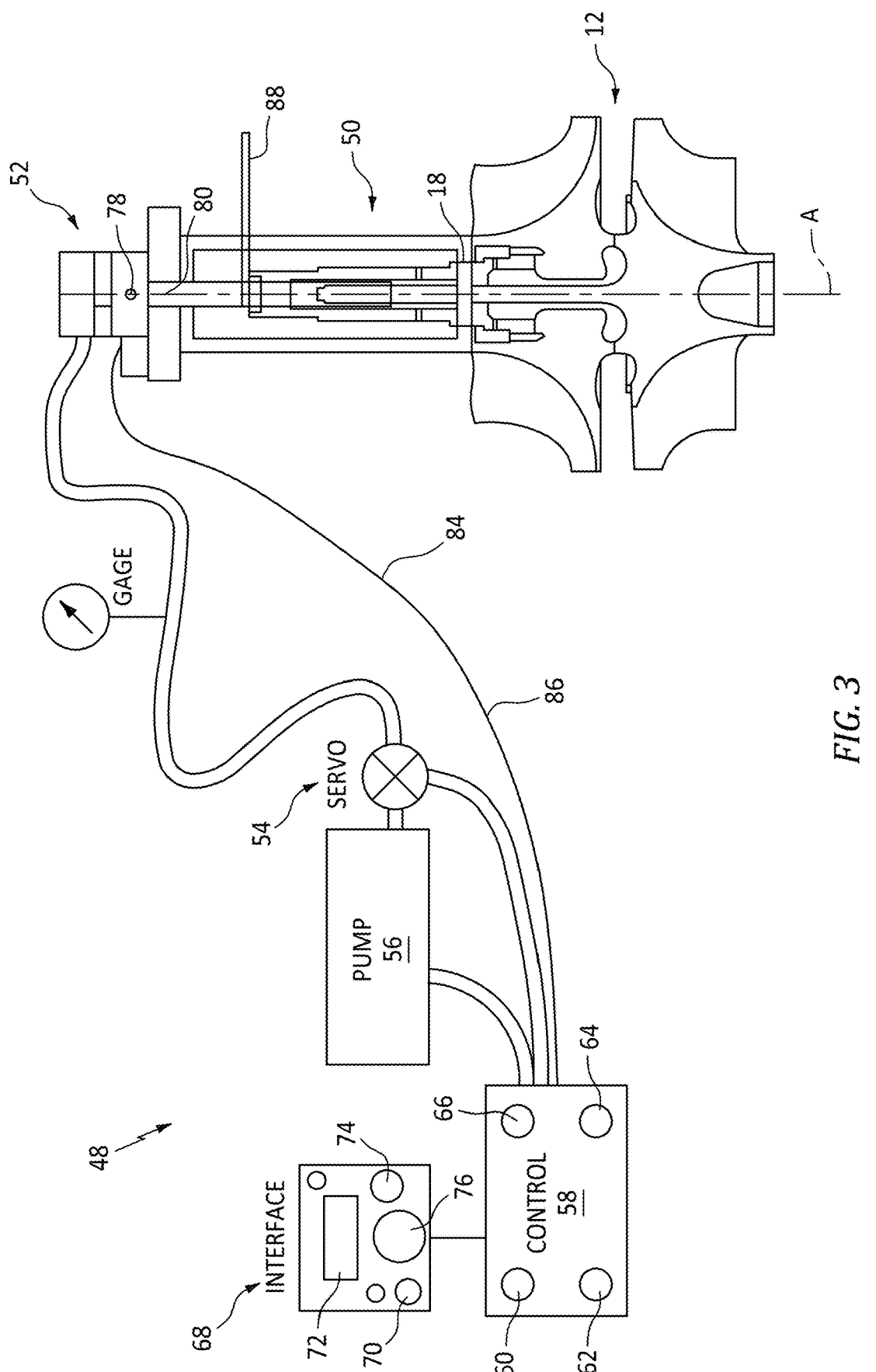
FIG. 3 is a schematic representation of an exemplary tie bolt stretch system for a single curvic rotor assembly.

Referring also to FIG. 3, the rotor system 12 is shown coupled with the tie bolt stretch system 48. The tie bolt stretch system 48 is configured to load/stretch the tie bolt 18 within the rotor system 12. Rotor assembly 12 balancing is performed as a mitigation for manufacturing variation and shaft stretch is required to mitigate the coefficient of thermal expansion differences for material selection of the various turbomachinery parts.

The tie bolt stretch system 48 includes a stretch tool 50 in operative communication with the rotor assembly 12. The tie bolt stretch system 48 can be employed to establish and determine the actual physical distance of the tie bolt 18 stretch to secure the curvic coupling 40,42. The stretch tool 50 includes a hydraulic piston 52 coupled with the tie bolt 18. The hydraulic piston 52 can be in operative communication with a servo valve 54 fluidly coupled to a hydraulic pump 56. The hydraulic piston 52 can have a hollow core. The hydraulic piston 52 can be regulated by the servo valve 54 via a controller 58 with control software 60.

The controller 58 may include hardware, firmware, and/or software components that are configured to control the components of the stretch tool 50 and/or tie bolt stretch system 48 to perform the functions disclosed herein. While not specifically shown, the controller 58 may include other computing devices (e.g., servers, mobile computing devices, etc.) which may be in communication with each other and/or the controller 58 via a communication network 62 to perform one or more of the disclosed functions. The controller 58 may include at least one processor 64 (e.g., a controller, microprocessor, microcontroller, digital signal processor, etc.), memory 66, and an input/output (I/O) subsystem 68. The controller 58 may be embodied as any type of computing device e.g., a server, an enterprise computer system, a network of computers, a combination of computers and other electronic devices, or other electronic devices. Although not specifically shown, the I/O subsystem 68 typically includes, for example, an I/O controller, a memory controller, and one or more I/O ports. The processor 64 and the I/O subsystem 68 are communicatively coupled to the memory 66. The memory 66 may be embodied as any type of computer memory device (e.g., volatile memory such as various forms of random access memory).

The I/O subsystem 68 is communicatively coupled to a number of hardware, firmware, and/or software components, including a data storage device 70, a display 72, a communication subsystem 74, and a user interface (UI) subsystem 76. The data storage device 70 may include one or more hard drives or other suitable persistent storage devices (e.g., flash memory, memory cards, memory sticks, and/or others).

The display 72 may be embodied as any type of digital display device, such as a liquid crystal display (LCD), and may include a touchscreen. The display 72 is configured or selected to be capable of displaying two- and/or three-dimensional graphics. The communication subsystem 74 may include one or more optical, wired, and/or wireless network interface subsystems, cards, adapters, or other devices, as may be needed pursuant to the specifications and/or design of the particular computing device. The user interface subsystem 76 may include one or more user input devices (e.g., the display 72, a microphone, a touchscreen, keyboard, virtual keypad, etc.) and one or more output devices (e.g., audio speakers, LEDs, additional displays, etc.) to facilitate loading the rotor assembly 12.

The stretch tool 50 applies a tensile force on the tie bolt 18 and rotor assembly 12 to preload the tie bolt 18 and rotor assembly 12. The forces applied to the tie bolt 18 are purely linear along the axis A. There is no rotation of the tie bolt 18, and thus no torsion loads on the tie bolt 18. The tensile forces are created using the hydraulic piston 52.

A sensor 78 can be in operative communication with a shaft 80 of the hydraulic piston 52. The sensor 78 can include a strain gauge, a linear variable differential transducer or similar device configured to very accurately measure the change in location of the hydraulic piston 52. In an exemplary embodiment, a laser sensor 82 can be employed to detect the position of the hydraulic piston 52, such as by sensing changes in dimensions along the shaft 80. The sensors 78 and 82 can be in operative communication with the controller 58 via a communication line 84. The sensors 78, 82 can precisely provide input signals 86 to the controller 58 in real time. The input signals 86 can contain data that can be recorded and displayed and utilized in future operations. The controller 58 can provide automatic data logging, and statistical control to ensure that the rotor assembly 12 are appropriately stretched. A wrench 88 can be employed to lock in the preload by adjusting a mechanism along the shaft 80.

The tie bolt stretch system 48 can be configured to precisely control the amount of stretch to ensure the preload is correctly applied. The tie bolt stretch system 48 is configured to precisely control the amount of stretch to ensure the preload is accurately repeatable. In an exemplary embodiment, the tie bolt stretch system 48 is configured to apply the preload stretch during the balance stage of the rotor assembly 12 and during the reassembly stage of the rotor assembly 12. The tie bolt stretch system 48 is configured to identify anomalies in real time to define nonconforming hardware, improperly heat treated material, and the like.

A technical advantage of the disclosed tie bolt stretch system includes the benefit of a manufacturing technique adopted to highly accurate fabrication and assembly methods, and predictive analytical design tools applied to evaluate production accommodations to control or reduce the magnitude and/or frequency of vibration(s) of the APU rotor assembly containing curvic couplings.

Another technical advantage of the disclosed tie bolt stretch system includes improving first pass yields and driving down scrap.

Another technical advantage of the disclosed tie bolt stretch system includes automating measurement of the amount of tie bolt stretch for both of the measurements before the stretch and after the stretch.

Another technical advantage of the disclosed tie bolt stretch system includes the capacity to identify issues with nonconforming parts, processing and materials.

Another technical advantage of the disclosed tie bolt stretch system includes the capability to precisely control the amount of stretch of the tie bolt to ensure the preload is correct in order to minimize vibration.

There has been provided a tie bolt stretch system. While the tie bolt stretch system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A tie bolt stretch system comprising:
a rotor assembly including a compressor section coupled with a turbine section by a curvic coupling;
a tie bolt in operative communication with the rotor assembly, the tie bolt joining the compressor section to the turbine section;
a stretch tool in operative communication with the tie bolt; the stretch tool comprising:

a hydraulic piston in operative communication with the tie bolt, the hydraulic piston including a shaft with a predetermined dimension;

a sensor in operative communication with the stretch tool, the sensor configured to indicate a dimensional change of the predetermined dimension; and a controller in operative communication with the sensor and a servo valve; the servo valve is fluidly coupled with a hydraulic pump; the hydraulic pump fluidly coupled with the hydraulic piston; wherein the controller is configured to operate the hydraulic piston responsive to a signal from the sensor to attain a predetermined preload stretch on the tie bolt, curvic coupling, compressor section and turbine section.

2. The tie bolt stretch system according to claim 1, further comprising:

a powerhead compressor within the compressor section;

a power turbine within the turbine section; and a predetermined contact stiffness between the powerhead compressor and the power turbine; wherein the predetermined preload stretch is determined based at least in part on the predetermined contact stiffness.

3. The tie bolt stretch system according to claim 1, wherein the predetermined preload stretch on the tie bolt along with internal rotor geometric interfaces is configured to influence a rotor generated vibration.

4. The tie bolt stretch system according to claim 1, wherein the sensor is configured to measure the change in location of the hydraulic piston.

5. The tie bolt stretch system according to claim 1, wherein the stretch tool is configured to apply a tensile force on the tie bolt and the rotor assembly to preload the tie bolt and the rotor assembly.

6. The tie bolt stretch system according to claim 5, wherein the tensile force applied to the tie bolt is linear along an axis formed between the compressor section joined to the turbine section.

7. The tie bolt stretch system according to claim 1, wherein the sensor comprises at least one of a strain gauge, a linear variable differential transducer, and a laser device configured to measure the change in location of the hydraulic piston.

8. A tie bolt stretch system comprising:

a rotor assembly including a compressor section coupled with a turbine section by a curvic coupling; the compressor section including at least one of a powerhead compressor and a load compressor;

a tie bolt in operative communication with the rotor assembly, the tie bolt joining the compressor section to the turbine section;

a stretch tool in operative communication with the tie bolt; the stretch tool comprising:

a hydraulic piston in operative communication with the tie bolt, the hydraulic piston including a shaft with a predetermined dimension;

a sensor in operative communication with the stretch tool, the sensor configured to indicate a dimensional change of the predetermined dimension; and a controller in operative communication with the sensor and a servo valve; the servo valve is fluidly coupled with a hydraulic pump; the hydraulic pump fluidly coupled with the hydraulic piston; wherein the controller is configured to operate the hydraulic piston responsive to a signal from the sensor to attain a predetermined preload stretch on the tie bolt, curvic coupling, compressor section and turbine section.

9. The tie bolt stretch system according to claim 8, further comprising:

a load curvic coupling within the compressor section between the powerhead compressor and the load compressor;

a power turbine within the turbine section; and a predetermined contact stiffness between the powerhead compressor and the power turbine, wherein the predetermined preload stretch is determined based at least in part on the predetermined contact stiffness.

10. The tie bolt stretch system according to claim 8, wherein the predetermined preload stretch on the tie bolt along with internal rotor geometric interfaces is configured to influence a rotor generated vibration.

11. The tie bolt stretch system according to claim 8, wherein the sensor is configured to measure the change in location of the hydraulic piston.

12. The tie bolt stretch system according to claim 8, wherein the stretch tool is configured to apply a tensile force on the tie bolt and the rotor assembly to preload the tie bolt and the rotor assembly.

13. The tie bolt stretch system according to claim 8, wherein the sensor comprises at least one of a strain gauge, a linear variable differential transducer, and a laser device configured to measure the change in location of the hydraulic piston.

14. A process for stretching a tie bolt with a tie bolt stretch system comprising:

forming a rotor assembly coupling a compressor section with a turbine section through a curvic coupling;

coupling a tie bolt in operative communication with the rotor assembly;

joining the compressor section to the turbine section with the tie bolt;

coupling a stretch tool in operative communication with the tie bolt; the stretch tool comprising:

a hydraulic piston in operative communication with the tie bolt, the hydraulic piston including a shaft with a predetermined dimension;

a sensor in operative communication with the stretch tool, the sensor configured to indicate a dimensional change of the predetermined dimension; and a controller in operative communication with the sensor and a servo valve; the servo valve is fluidly coupled with a hydraulic pump; the hydraulic pump fluidly coupled with the hydraulic piston; wherein the controller is configured to operate the hydraulic piston responsive to a signal from the sensor to attain a predetermined preload stretch on the tie bolt, curvic coupling, compressor section and turbine section.

15. The process of claim 14, further comprising:

forming a powerhead compressor within the compressor section;

forming a power turbine within the turbine section; and creating a predetermined contact stiffness between the powerhead compressor and the power turbine; wherein the predetermined preload stretch is determined based at least in part on the predetermined contact stiffness.

16. The process of claim 14, further comprising:

configuring the predetermined preload stretch on the tie bolt along with internal rotor geometric interfaces to influence a rotor generated vibration.

17. The process of claim 14, further comprising:

configuring the sensor to measure the change in location of the hydraulic piston.

18. The process of claim 14, further comprising:
configuring the stretch tool to apply a tensile force on the
tie bolt and the rotor assembly to preload the tie bolt
and the rotor assembly.

19. The process of claim 14, further comprising:
applying the tensile force to the tie bolt configured as
purely linear along an axis formed between the com-
pressor section joined to the turbine section.

20. The process of claim 14, wherein the sensor comprises
at least one of a strain gauge, a linear variable differential
transducer, and a laser device configured to measure the
change in location of the hydraulic piston.

\* \* \* \* \*